(12) United States Patent
Blum et al.

(10) Patent No.: US 11,799,272 B2
(45) Date of Patent: Oct. 24, 2023

(54) DUAL CONTACTOR ELECTRICAL PANELBOARD ASSEMBLY, SYSTEMS AND METHODS

(71) Applicant: EATON INTELLIGENT POWER LIMITED, Dublin (IE)

(72) Inventors: Andrew D. Blum, Jamesville, NY (US); Terry L. Moser, Pasadena, TX (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/117,659

(22) Filed: Dec. 10, 2020

(65) Prior Publication Data

US 2021/0184438 A1 Jun. 17, 2021

Related U.S. Application Data

(60) Provisional application No. 62/947,575, filed on Dec. 13, 2019.

(51) Int. Cl.
 *H02B 1/42* (2006.01)
 *H02B 1/20* (2006.01)
 (Continued)

(52) U.S. Cl.
 CPC ............... *H02B 1/04* (2013.01); *H02B 1/06* (2013.01); *H02B 1/28* (2013.01); *H02B 1/42* (2013.01); *H02B 1/20* (2013.01)

(58) Field of Classification Search
 CPC ..... H02B 1/04; H02B 1/06; H02B 1/14; H02B 1/20; H02B 1/24; H01H 71/0271; H01H 9/042
 See application file for complete search history.

(56) References Cited

U.S. PATENT DOCUMENTS 3,402,326 A * 9/1968 Guasco ................ H02H 1/0069
 361/48
4,536,823 A 8/1985 Ingram et al.
(Continued)

FOREIGN PATENT DOCUMENTS

CN 2870246 Y 2/2007
CN 201038605 Y * 3/2008
(Continued)

*Primary Examiner* — Robert J Hoffberg
(74) *Attorney, Agent, or Firm* — Baker Botts L.L.P.

(57) ABSTRACT

A panelboard assembly for a harsh and/or hazardous environment is provided. The panelboard assembly includes a main breaker assembly, a first subpanel assembly, and a second subpanel assembly. The first subpanel assembly includes a first contactor assembly, and a first branch breaker assembly electrically connected to the first contactor assembly and configured to be electrically connected to a first group of loads. The first contactor assembly is configured to switch the first group of loads on and off all at once. The second subpanel assembly is electrically connected in parallel to the first subpanel assembly, and includes a second contactor assembly and a second branch breaker assembly electrically connected to the second contactor assembly and configured to be electrically connected to a second group of loads. The second contactor assembly is configured to switch the second group of loads on and off all at once.

18 Claims, 5 Drawing Sheets

(51) Int. Cl.
*H02B 1/04* (2006.01)
*H02B 1/06* (2006.01)
*H02B 1/28* (2006.01)

(56) References Cited

U.S. PATENT DOCUMENTS

| | | | |
|---|---|---|---|
| 4,783,718 A | 11/1988 | Raabe et al. | |
| 5,233,511 A | 8/1993 | Bilas et al. | |
| 6,229,692 B1 * | 5/2001 | Stendardo | H02B 1/04 |
| | | | 174/68.2 |
| 6,570,754 B2 * | 5/2003 | Foley | H02B 1/056 |
| | | | 361/652 |
| 6,813,525 B2 | 11/2004 | Reid et al. | |
| 6,920,038 B2 * | 7/2005 | Gehlbach | H02B 1/056 |
| | | | 361/822 |
| 6,989,996 B2 | 1/2006 | Wells et al. | |
| 7,589,625 B2 * | 9/2009 | Vicente | H05B 47/19 |
| | | | 340/506 |
| 7,889,476 B2 * | 2/2011 | King, Jr. | H02J 13/00034 |
| | | | 361/160 |
| 8,305,739 B2 * | 11/2012 | Dozier | H02B 1/056 |
| | | | 361/627 |
| 8,570,714 B2 * | 10/2013 | Weighell | H02B 1/202 |
| | | | 361/624 |
| 8,982,539 B2 * | 3/2015 | Weighell | H02B 1/202 |
| | | | 361/624 |
| 9,608,413 B2 | 3/2017 | Kubota et al. | |
| 10,439,373 B2 | 10/2019 | Shindo et al. | |
| 10,951,027 B2 * | 3/2021 | Thornton | H02J 3/381 |
| 11,018,479 B2 * | 5/2021 | Ogai | H02B 1/04 |
| 2007/0144779 A1 * | 6/2007 | Vicente | H05B 47/18 |
| | | | 174/520 |
| 2016/0315453 A1 | 10/2016 | Taylor et al. | |

FOREIGN PATENT DOCUMENTS

| | | |
|---|---|---|
| CN | 202523299 U * | 11/2012 |
| CN | 205862207 U * | 1/2017 |
| CN | 106571592 A * | 4/2017 |
| CN | 106571592 A | 4/2017 |
| CN | 207124369 U * | 3/2018 |
| CN | 107994563 A * | 5/2018 |
| CN | 108035889 A * | 5/2018 |
| EP | 1921728 A2 | 5/2008 |
| JP | H1070803 A * | 10/1998 |
| KR | 102316044 B1 * | 10/2021 |
| WO | 1993000623 A1 | 1/1993 |
| WO | 2017179092 A1 | 10/2017 |
| WO | 2018049361 A1 | 3/2018 |

* cited by examiner

DUAL CONTACTOR ELECTRICAL PANELBOARD ASSEMBLY, SYSTEMS AND METHODS

CROSS REFERENCE TO RELATED APPLICATIONS

This application claims the benefit of U.S. Provisional Application Ser. No. 62/947,575 filed Dec. 13, 2019, the entire disclosure of which is hereby incorporated by reference in its entirety.

BACKGROUND

The field of the invention relates generally to heavy duty electrical panelboard assemblies for industrial systems, and more particularly to heavy duty, harsh and/or hazardous environment electrical panelboard assemblies including dual contactor assemblies.

Certain types of conventional panelboard assemblies include a contactor for simultaneous switching of power circuits connected through the panelboard. During troubleshooting, maintenance, and repair, such conventional panelboards are typically entirely switched off via the contactor provided. That is, all of the loads fed by the panelboard are to be disconnected or switched off via actuation of the contactor. In certain applications, however, certain loads such as motors or lighting may desirably be used while other loads are switched off, and as such more than one panelboard is typically utilized to feed different loads, with each panelboard including a separate contactor for simultaneous switching of the loads connected to each panelboard. Further, conventional panelboard assemblies include one enclosure per contactor assembly in addition to the panelboard itself, which in combination requires a large footprint and increased expense for installation.

While known panelboard assemblies of the type described above are satisfactory in many cases in some applications, they remain disadvantaged and improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION

Exemplary embodiments of panelboard assemblies disclosed herein provide heavy duty, harsh and/or hazardous environment capability with dual contactor assemblies integrated in the panelboard assembly. Each contactor assembly switches a separate group of loads on or off in the same panelboard assembly, eliminating a conventionally provided second panelboard assembly, and also eliminating separately provided enclosures for the contactors as conventionally provided.

Electrical power systems sometimes operate within hazardous environments presenting a risk of explosion via ignition of a surrounding gas or vapor dusts, fibers, or flyings. Such hazardous environments may arise, for example without limitation, in petroleum refineries, petrochemical plants, grain silos, waste water treatment facilities and/or other industrial facilities, wherein volatile conditions are produced in the ambient environment and present a heightened risk of fire or explosion. A temporary or sustained presence of airborne ignitable gas, ignitable vapors, ignitable dust or otherwise flammable substances presents substantial concerns regarding safe and reliable operation of such facilities overall, including but not limited to safe operation of the electrical power system itself, which in some instances by virtue of conventional circuit protector devices may produce ignition sources in normal operation and in the presence of an electrical fault. As such, a number of standards have been promulgated relating to electrical product use in explosive environments to improve safety in hazardous locations in view of an assessed probability of explosion or fire risk.

For example, Underwriter's Laboratories ("UL") standard UL 1203 sets forth Explosion-Proof and Dust-Ignition-Proof Electrical Equipment criteria for hazardous locations. Explosion-Proof and Dust-Ignition-Proof enclosures are available to enclose or contain electrical products. In combination with appropriate Explosion-Proof and Dust-Ignition-Proof enclosures, electrical equipment manufacturers may receive UL certification of compliance with the applicable rating standards for hazardous locations, and UL certification is an important aspect of a manufacturer's ability to successfully bring products to market in North America or any other market accepting of UL standard 1203.

The National Electric Code (NEC) generally classifies hazardous locations by class and division. Class I locations are those in which flammable vapors and gases may be present. Class II locations are those in which combustible dust may be found. Class III locations are those which are hazardous because of the presence of easily ignitable fibers or flyings. Considering Class I, Division 1 covers locations where flammable gases or vapors may exist under normal operating conditions, under frequent repair or maintenance operations, or where breakdown or faulty operation of process equipment might also cause simultaneous failure of electrical equipment. Division 1 presents a greater risk of explosion than, for example, Division 2 where flammable gases or vapors are normally handled either in a closed system, confined within suitable enclosures, or are normally prevented by positive mechanical ventilation.

The International Electrotechnical Commission (IEC) likewise categorizes hazardous locations into Class I, Zone 0, 1, or 2 representing locations in which flammable gases or vapors are or may be airborne in an amount sufficient to produce explosive or ignitable mixtures. As defined in the IEC, a Class I, Zone 0 location is a location in which ignitable concentrations of flammable gases or vapors are present continuously or for long periods of time. A Class I, Zone 1 location is a location in which ignitable concentrations of flammable gases or vapors are likely to exist because of repair or maintenance operations or because of leakage or possible release of ignitable concentrations of flammable gases or vapors, or is a location that is adjacent to a Class I, Zone 0 location from which ignitable concentrations of vapors could be communicated.

Given that electrical devices, such as those described below, can be ignition sources in certain circumstances, explosion-proof, flame-proof, or ignition proof enclosures are conventionally provided in NEC Division 1 or 2 locations and/or IEC Zone 1 or 2 locations to house electrical devices that pose ignition risk. The terms "explosion-proof" or "flame-proof" in this context, refer to enclosures that are designed to be capable of containing an internal explosion of a specified flammable vapor-air mixture.

In addition to hazardous locations discussed above, so-called harsh locations also require specific focus in the design of panelboard assemblies used therewith. Harsh locations may entail corrosive elements and the like in the atmosphere that are not necessarily explosive and/or are subject to temperature cycling, pressure cycling, shock and/or mechanical vibration forces that are typically not present in non-harsh operating environments. Of course, some locations in which panelboard assemblies are desirably employed are both harsh and hazardous by nature, and are therefore panelboard assemblies designed for various operating conditions, for which typical panelboard assemblies for other uses are unsatisfactory.

Figure 1:
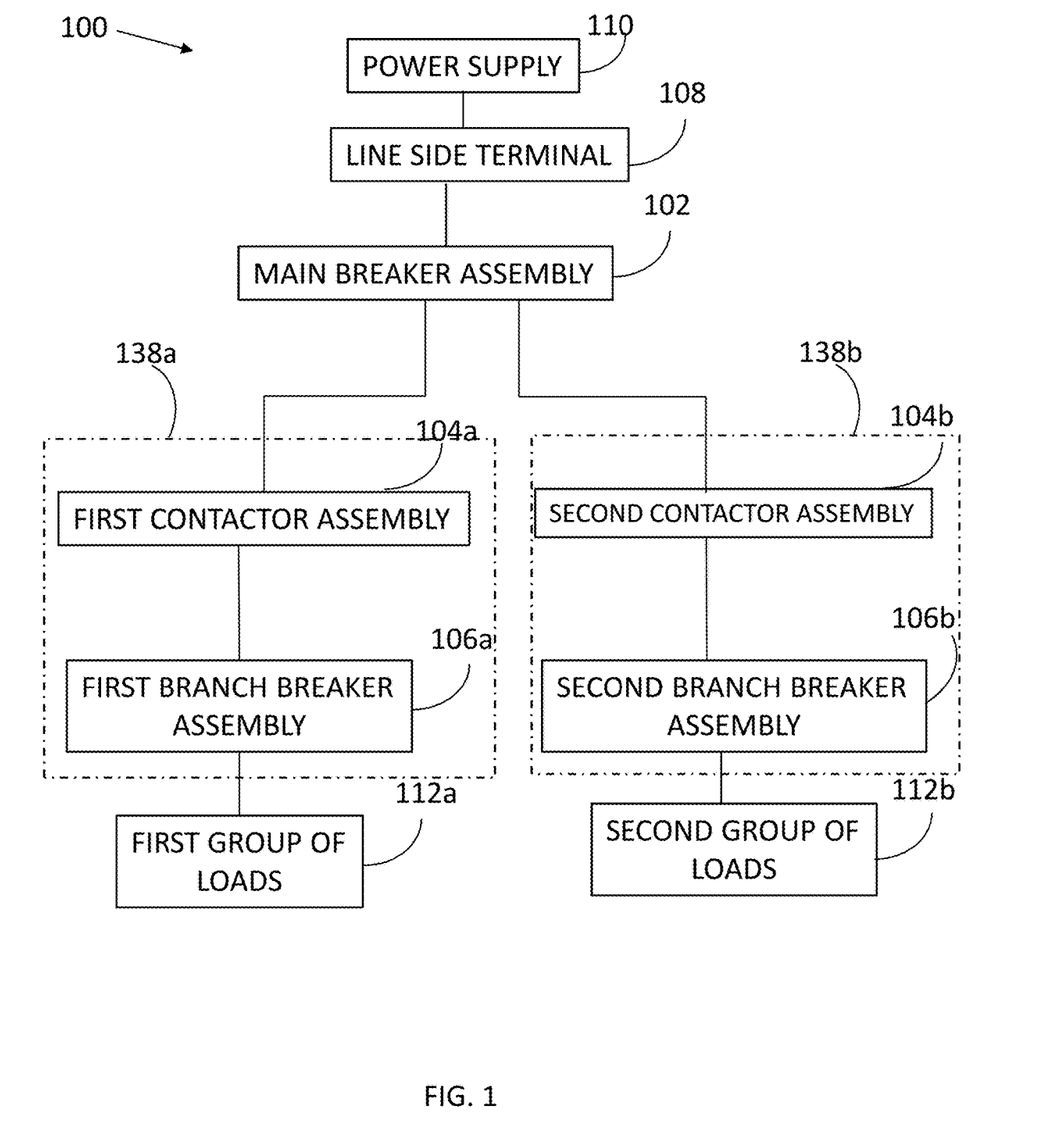
FIG. 1 is a schematic diagram of an exemplary panelboard assembly.

FIG. 1 shows a schematic diagram of an exemplary heavy duty, harsh and/or hazardous environment panelboard assembly 100. In the exemplary embodiment shown, panelboard assembly 100 includes a main breaker assembly 102, first and second contactor assemblies 104a, 104b, and first and second branch breaker assembly 106a, 106b. Panelboard assembly 100 may further include a line side terminal 108, which is configured to be electrically connected to a power supply 110. Power supply 110 may be an alternating current (AC) power supply such as a three-phase AC power supply, or a direct current (DC) power supply. Main breaker assembly 102 is electrically connected to line side terminal 108 and configured to switch the entire panelboard assembly 100 on or off as needed, irrespective of any operating position of the first and second contactor assemblies 104a, 104b or any secondary circuit breaker or switch associated with the first and second branch breaker assemblies 106a, 106b.

In the exemplary embodiment, first and second contactor assemblies 104a, 104b are electrically connected in parallel to each other and are each electrically connected to main breaker assembly 102 in a split bus configuration. First and second contactor assemblies 104a, 104b each include one or more contactors 304 (shown in FIG. 3C). Contactors 304 may be manually switched on or off, and/or may be automatically switched on or off through a photoresistor, a timer, another switch, or a controller as desired.

In the contemplated embodiment, first contactor assembly 104a is further electrically connected to first branch breaker assembly 106a, which is configured to control a first group of loads 112a. First branch breaker assembly 106a includes one or more branch circuit breakers 113 (shown in FIGS. 2-3C). Each branch circuit breaker 113 is electrically connected to one or more loads in first group 112a and is configured to individually switch the connected loads on or off. Second contactor assembly 104b is further electrically connected to second branch breaker assembly 106b, which includes one or more branch circuit breakers 113 configured to individually switch a second group of connected loads 112b on or off In the exemplary embodiment, first and second subpanel assemblies 138a, 138b (also see FIG. 3C) are formed in panelboard assembly 100. First subpanel assembly 138a includes first contactor assembly 104a and first branch breaker assembly 106a. Second subpanel assembly 138b includes second contactor assembly 104b and second branch breaker assembly 106b. Two subpanel assemblies are shown only as an example herein. Panelboard assembly 100 may include more than two subpanel assemblies 138a, 138b. In other words, panelboard assembly 100 may include more than two contactor assemblies and more than two branch breaker assemblies, and each of the contactor assemblies is used to switch a separate group of loads on or off.

In operation, first and second contactor assemblies 104a, 104b are used to switch on or off one half of panelboard assembly 100 by simultaneously connecting or disconnecting the entirety of the branch breaker assemblies 106a, 106b. For example, if a user wants to switch on or off first group of loads 112a all at once, the user may use first contactor assembly 104a to carry out that operation, instead of switching on or off all of the individual branch circuit breakers 113 in first branch breaker assembly 106a one by one. Similarly, the user may use second contactor assembly 104b to switch on or off second group of loads 112b all at once, instead of switching on or off individual breakers in second branch breaker assembly 106b. In this manner, the first and second groups of loads 112a, 112b are switched on and off more quickly via the respective contactor assembly 104a, 104b than by switching on or off each of the individual branch circuit breakers 113 in the branch breaker assemblies 106a, 106b. A relatively safe and convenient environment is also provided by keeping one of the groups of loads (e.g., the first group of loads 112a) on via one of the contactor assemblies (e.g., the first contactor assembly 104a) while the other group of loads (e.g., the second group of loads 112b) is switched off via the other contactor assembly (e.g., the second contactor assembly 104b) during troubleshooting, repair, and maintenance procedures.

In contemplated embodiments, panelboard assembly 100 is adapted for use in a harsh and/or hazardous environment such as for lighting, motor applications, and other power system needs. In a harsh and/or hazardous environment, all loads powered by a panelboard assembly should not be disconnected all at once, because certain loads such as motors or lighting are needed to be on during troubleshooting, maintenance, and repair. Panelboard assembly 100 may specifically be constructed for use in a Class I division 2 hazardous environment. Panelboard assembly 100 may also be used, however, in a non-hazardous environment as desired.

Figure 2:
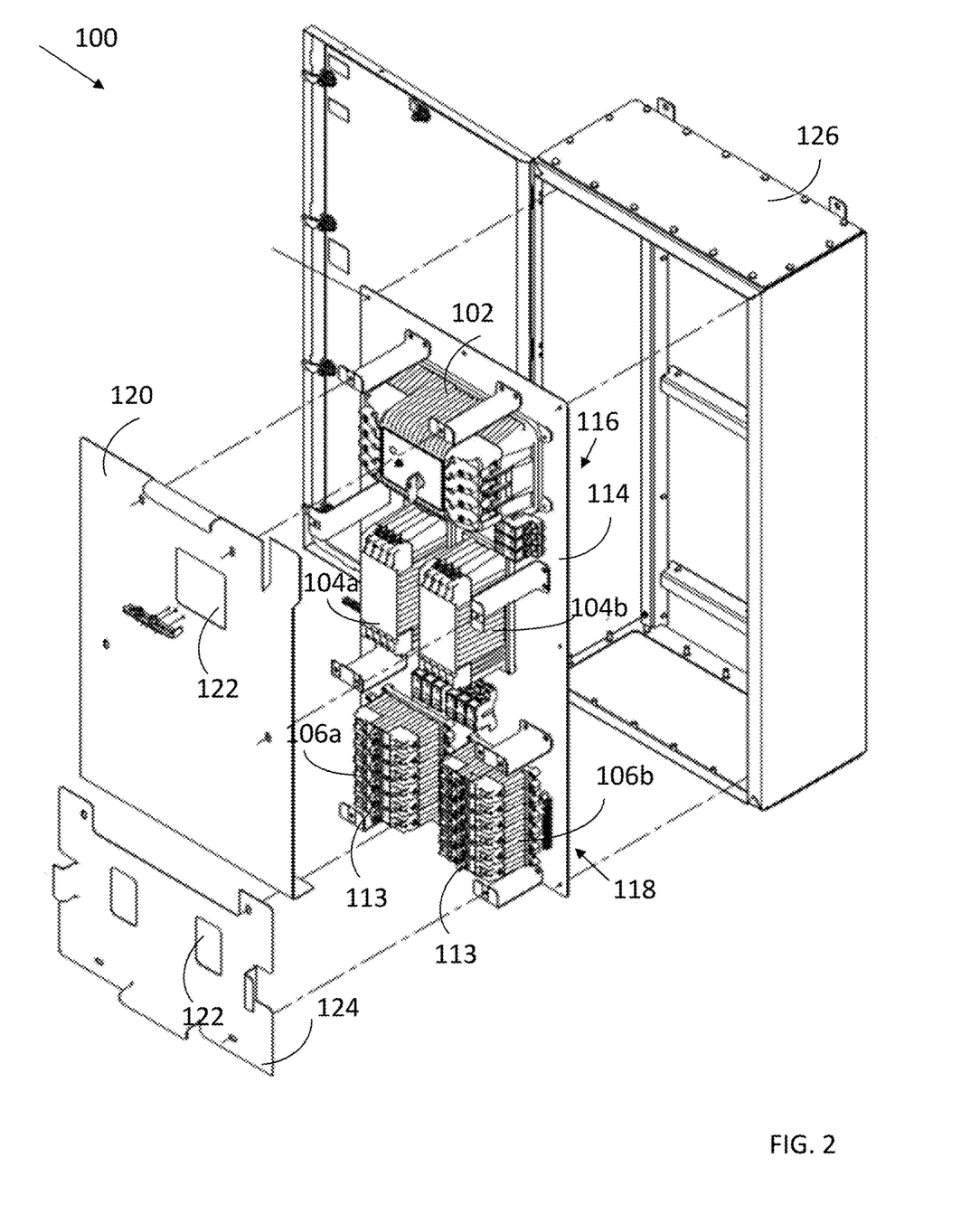
FIG. 2 is an exploded view of an exemplary embodiment of the panelboard assembly shown in FIG. 1.

FIG. 2 is an exploded view of panelboard assembly 100. Panelboard assembly 100 may further include a mounting board 114, on which electrical elements of panelboard assembly 100 such as main breaker assembly 102, first and second contactor assemblies 104a, 104b, and first and second branch breaker assemblies 106a, 106b are mounted. In the exemplary embodiment, panelboard assembly 100 may be divided into a main panel 116 and a branch panel 118. Main panel 116 may include main breaker assembly 102 and first and second contactor assemblies 104a, 104b. Branch panel 118 may include first and second branch breaker assemblies 106a, 106b. Panelboard assembly 100 may further include a main panel dead front 120. Main panel dead front 120 may be used to cover at least a portion of main panel 116. Main panel dead front may further include one or more slots 122 that allow access to main breaker assembly 102 to switch main breaker assembly 102 on or off when main panel dead front is placed over main panel 116. Panelboard assembly 100 may also include a branch panel dead front 124 for covering at least a portion of branch panel 118. Branch panel dead front 124 may also include one or more slots 122 for access to first or second branch breaker assembly 106a, 106b.

In the exemplary embodiment, panelboard assembly 100 may further include an enclosure 126 that is used to enclose main panel 116 and branch panel 118. Enclosure 126 also encloses main panel dead front 120 and branch panel dead front 124 if main panel dead front 120 and branch panel dead front 124 are used. As a result, one enclosure 126 encloses two sets of contactor assembly 104a, 104b and branch breaker assembly 106a, 106b. In comparison to a conventional panelboard assembly, wherein two enclosures are used to each respectively enclose a branch breaker assembly plus a separate enclosure for each contactor connected to each panel board, which takes up significantly more space than panel board assembly 100, not to mention a more costly assembly from a material and labor perspective to provide and install.

Figure 3A:
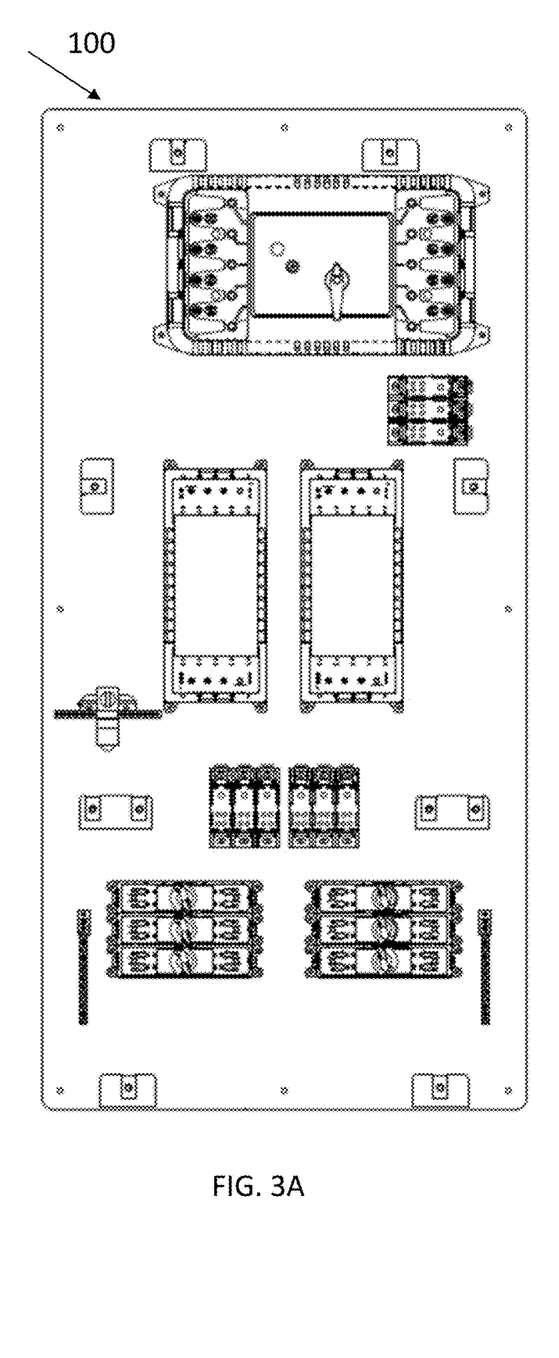
FIG. 3A is a partial front view of the panelboard assembly shown in FIG. 2 without an enclosure.
Figure 3B:
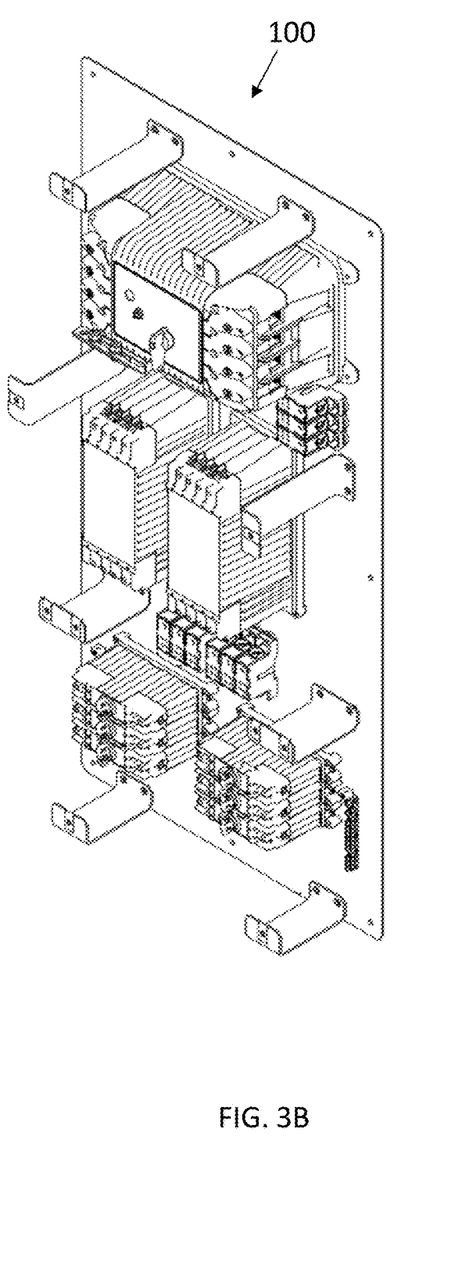
FIG. 3B is a perspective view of a portion of the panelboard assembly shown in FIG. 3A.
Figure 3C:
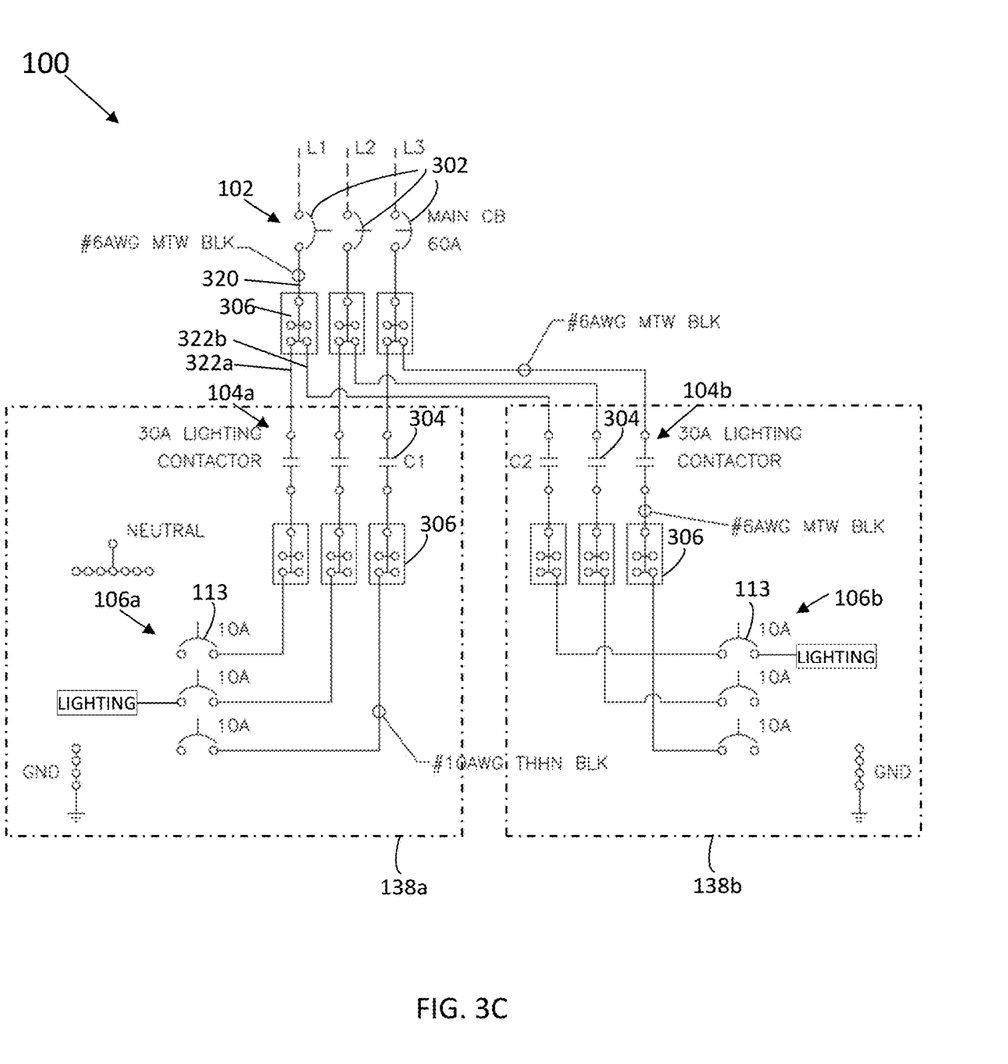
FIG. 3C is an electrical circuit diagram of the panelboard assembly shown in FIG. 3A.

FIGS. 3A and 3B are front and perspective views, respectively, of panelboard assembly 100 without enclosure 126. FIG. 3C is a circuit diagram of panelboard assembly 100. The ratings of electronic components included in FIG. 3C are exemplary only and may be higher or lower in other embodiments. In the exemplary embodiment, panelboard assembly 100 is configured to be electrically connected to a three-phase AC power supply through lines L1, L2, and L3 (see FIG. 3C). Connection to a three-phase AC power supply is used only as an example herein. Panelboard assembly 100 may be connected to AC power supplies of other distribution configurations or a DC power supply.

In the exemplary embodiment, main breaker assembly 102 includes three circuit breakers 302, one for each phase of a three-phase power supply as shown in FIG. 3C as L1, L2, L3. First and second contactor assemblies 104a, 104b each include three contactors 304, also one for each phase, connected downstream from main breaker assembly 102. First and second branch breaker assemblies 106a, 106b are connected downstream from the first and second contactor assemblies 104a, 104b, and each includes three branch circuit breakers 113 in the illustrated example. Each phase of branch breaker assemblies 106a, 106b may include more than one branch circuit breaker 113. Each branch circuit breaker 113 may be electrically connected to one or more loads such as lighting loads shown in FIG. 3C. Panelboard assembly 100 may further include one or more power distribution blocks (PDB) 306, which are used as auxiliary power connections for electrical equipment. In the depicted example, PDB 306 is used to distribute electrical power from a single input power source to multiple devices downstream. For example, for each phase L1, L2, or L3, PDB 306 receives power supply from line L1, L2, or L3 through one single bus 320, and supplies power to first subpanel assembly 138a and second subpanel assembly 138b through separate buses 322a, 322b. PDBs 306 eliminate the need to wire each subpanel assembly 138a, 138b directly to the power supply, and provide a clean installation and save time and money. While a split bus configuration is shown in FIG. 3C, in further embodiments, more than two contactors 304 may be provided and electrically connected to one main circuit breaker 302 for each phase such that, for example only, one third of the loads connected to the panelboard may be simultaneously switched off by the respective contactors provided. As such, the number of contactors is scalable to provide any desired division of loads connected to the contactors while still maintaining a reduced footprint and cost relative to conventional panelboard solutions, as well as eliminating undesirable downtime of loads that conventional panelboard solutions entail.

In the example shown in FIG. 3C wherein lighting loads are connected through the panelboard, lighting in one area of a harsh and/or hazardous location may be simultaneously switched off via one of the contactors while the lighting in another area may be simultaneously switched on, or vice versa. Other loads, such as motors and the like, may be connected to another panelboard such that the motors may be switched off for maintenance purposes while the lighting remains on in the areas of the motors. Likewise, interior and exterior illumination may be coordinated via the panelboard via photocells or timers for energy conservation while still providing a safe and well-lit area when needed in the harsh and/or hazardous location. The auxiliary power connections described herein also provide conventional power connections when needed that do not require access to another panelboard that may power other loads such as motors and industrial processes. Meanwhile, the main breaker assembly 102 may disconnect the entire panelboard, including the contactor assemblies 104a, 104b in the case of an emergency.

Figure 4:
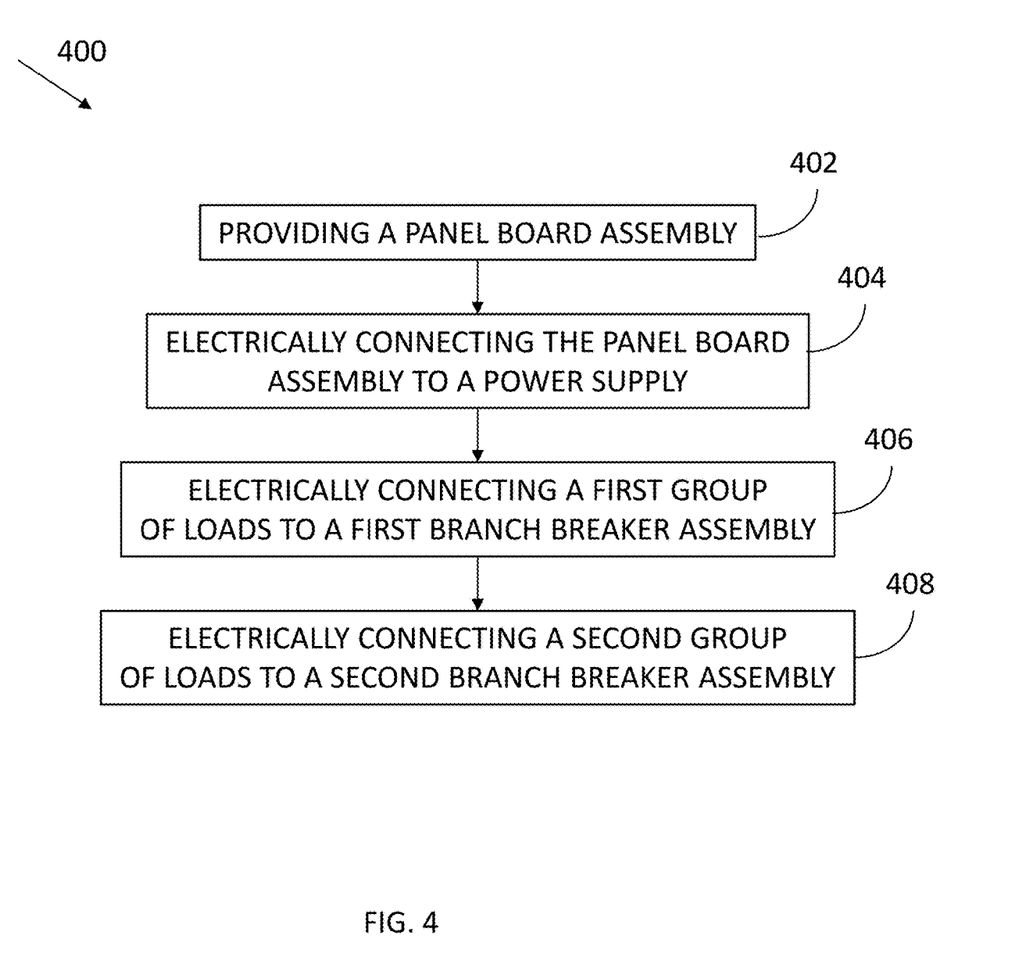
FIG. 4 is a flow chart illustrating an exemplary method of assembling an electrical assembly using the panelboard assembly shown in FIGS. 1-3C.

FIG. 4 shows an exemplary method 400 of assembling an electrical system for a harsh/hazardous environment and connecting a panelboard assembly such as that described above. Method 400 includes providing 402 a panelboard assembly. A panel board assembly may be any of the panel board assemblies 100 described above. Method 400 further includes electrically connecting 404 the panelboard assembly to a power supply. Method 400 also includes electrically connecting 406 a first group of loads to a first branch breaker assembly of the panelboard assembly. Further, method 400 includes electrically connecting 408 a second group of loads to the second branch breaker assembly of the panelboard assembly.

Various embodiments of panelboard assemblies are described herein including dual contactor assemblies in a panelboard assembly, thereby reducing downtime of an electrical assembly where one half of the electrical loads connected to the panelboard assembly is switched on or off independently from the other half of the loads connected to the panelboard. Further, a panelboard assembly having dual contactor assemblies is enclosed in only one enclosure, thereby reducing the cost and footprint of the panelboard assembly.

The benefits and advantages of the inventive concepts are now believed to have been amply illustrated in relation to the exemplary embodiments disclosed.

An embodiment of a panelboard assembly for a harsh and/or hazardous environment is disclosed. The panelboard assembly includes a main breaker assembly configured to be electrically connected to a power supply, a first subpanel assembly, and a second subpanel assembly. The first subpanel assembly includes a first contactor assembly electrically connected to the main breaker assembly, and a first branch breaker assembly electrically connected to the first contactor assembly and configured to be electrically connected to a first group of loads. The first branch breaker assembly includes one or more branch circuit breakers, and each of the one or more branch circuit breakers configured to control one or more loads in the first group of loads. The first contactor assembly is configured to switch the first group of loads on and off all at once. The second subpanel assembly is electrically connected in parallel to the first subpanel assembly, and includes a second contactor assembly electrically connected to the main breaker assembly and a second branch breaker assembly electrically connected to the second contactor assembly and configured to be electrically connected to a second group of loads. The second branch breaker assembly includes one or more branch circuit breakers, and each of the one or more branch circuit breakers configured to control one or more loads in the second group of loads. The second contactor assembly is configured to switch the second group of loads on and off all at once.

Optionally, the panelboard assembly further includes an enclosure enclosing the main breaker assembly, the first subpanel assembly, and the second subpanel assembly. At least one of the first contactor assembly and the second contactor assembly is switched on and off through a photoresistor. The panelboard assembly further includes a PDB electrically connected to the main breaker assembly, the first contactor assembly, and the second contactor assembly. The panelboard assembly further includes a branch panel dead front covering at least a portion of the first branch breaker assembly and at least a portion of the second branch breaker assembly, wherein the branch panel dead front further includes one or more slots providing access to at least one of the first branch breaker assembly and the second branch breaker assembly. The panelboard assembly further includes a main panel dead front covering at least a portion of the main breaker assembly, wherein the main panel dead front further includes one or more slots providing access to the main breaker assembly. The panelboard assembly further includes a mounting board, wherein the main breaker assembly, the first subpanel assembly, and the second subpanel assembly are mounted on the mounting board.

Another embodiment of a panelboard assembly for a harsh and/or hazardous environment is disclosed. The panelboard assembly includes a first subpanel assembly, a second subpanel assembly, and an enclosure. The first subpanel assembly includes a first contactor assembly configured to be electrically connected to a power supply and a first branch breaker assembly electrically connected to the first contactor assembly and configured to be electrically connected to a first group of loads. The first branch breaker assembly includes one or more branch circuit breakers, and each of the one or more branch circuit breakers configured to control one or more loads in the first group of loads. The first contactor assembly is configured to switch the first group of loads on and off all at once. The second subpanel assembly is electrically connected in parallel to the first subpanel assembly, and includes a second contactor assembly configured to be electrically connected to the power supply and a second branch breaker assembly electrically connected to the second contactor assembly and configured to be electrically connected to a second group of loads. The second branch breaker assembly includes one or more branch circuit breakers, and each of the one or more branch circuit breakers configured to control one or more loads in the second group of loads. The second contactor assembly is configured to switch the second group of loads on and off all at once. The enclosure encloses the first subpanel assembly and the second subpanel assembly.

Optionally, the panelboard assembly further includes a main breaker assembly electrically connected to the first subpanel assembly and the second subpanel assembly, the main breaker assembly configured to switch on or off an electrical connection to the power supply. The panelboard assembly further includes a PDB electrically connected to the main breaker assembly, the first subpanel assembly, and the second subpanel assembly. The panelboard assembly further includes a main panel dead front covering at least a portion of the main breaker assembly, wherein the main panel dead front further includes one or more slots providing access to the main breaker assembly. The panelboard assembly further includes a mounting board, wherein the first subpanel assembly and the second subpanel assembly are mounted on the mounting board. At least one of the first contactor assembly and the second contactor assembly is switched on and off through a photoresistor. The panelboard assembly further includes a branch panel dead front covering at least a portion of the first branch breaker assembly and at least a portion of the second branch breaker assembly, wherein the branch panel dead front further includes one or more slots providing access to at least one of the first branch breaker assembly and the second branch breaker assembly.

An embodiment of a method of assembling an electrical assembly for a harsh and/or hazardous environment is provided. The method includes providing a panelboard assembly. The panelboard assembly includes a main breaker assembly configured to be electrically connected to a power supply, a first subpanel assembly, and a second subpanel assembly. The first subpanel assembly includes a first contactor assembly electrically connected to the main breaker assembly, and a first branch breaker assembly electrically connected to the first contactor assembly and configured to be electrically connected to a first group of loads. The first branch breaker assembly includes one or more branch circuit breakers, and each of the one or more branch circuit breakers configured to control one or more loads in the first group of loads. The first contactor assembly is configured to switch the first group of loads on and off all at once. The second subpanel assembly is electrically connected in parallel to the first subpanel assembly, and includes a second contactor assembly electrically connected to the main breaker assembly and a second branch breaker assembly electrically connected to the second contactor assembly and configured to be electrically connected to a second group of loads. The second branch breaker assembly includes one or more branch circuit breakers, and each of the one or more branch circuit breakers configured to control one or more loads in the second group of loads. The second contactor assembly is configured to switch the second group of loads on and off all at once. The method also includes electrically connecting the panelboard assembly to the power supply by electrically connecting the main breaker assembly to the power supply. The method further includes electrically connecting the first group of loads to the first branch breaker assembly by electrically connecting one of the one or more branch circuit breakers of the first branch breaker assembly with the one or more loads in the first group of loads. In addition, the method includes electrically connecting the second group of loads to the second branch breaker assembly by electrically connecting one of the one or more branch circuit breakers of the second branch breaker assembly with the one or more loads in the second group of loads.

Optionally, the panelboard assembly further includes an enclosure enclosing the main breaker assembly, the first subpanel assembly, and the second subpanel assembly. At least one of the first contactor assembly and the second contactor assembly is switched on and off through a photoresistor. The panelboard assembly further includes a branch panel dead front covering at least a portion of the first branch breaker assembly and at least a portion of the second branch breaker assembly, wherein the branch panel dead front further includes one or more slots providing access to at least one of the first branch breaker assembly and the second branch breaker assembly. The panelboard assembly further includes a main panel dead front covering at least a portion of the main breaker assembly, wherein the main panel dead front further includes one or more slots providing access to the main breaker assembly. The panelboard assembly further includes a mounting board, wherein the main breaker assembly, the first subpanel assembly, and the second subpanel assembly are mounted on the mounting board.

While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from that described and depicted without departing from inventive concepts described. Also, in certain embodiments certain components in the assemblies described may be omitted to accommodate particular types of panelboard assemblies, or the needs of particular installations, while still providing cost effective panelboard assemblies for electrical wiring or cabling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A panelboard assembly for use in environments in which combustible or ignitable materials are present comprising:
   a main breaker assembly configured to be electrically connected to a three-phase power supply;
   a first subpanel assembly comprising:
      a first contactor assembly electrically connected to a load side of the main breaker assembly; and
      a first branch breaker assembly electrically connected to a load side of the first contactor assembly and configured to be electrically connected to a first group of loads, the first branch breaker assembly including a plurality of first branch circuit breakers, and each of the plurality of first branch circuit breakers is configured to switch on or off an electrical connection to a respective one or more loads in the first group of loads,
      wherein the first contactor assembly is configured to connect or disconnect power to the first branch breaker assembly and to the first group of loads all at once;
   a second subpanel assembly electrically connected in parallel to the first subpanel assembly and comprising:
      a second contactor assembly electrically connected to the load side of the main breaker assembly; and
      a second branch breaker assembly electrically connected to a load side of the second contractor assembly and configured to be electrically connected to a second group of loads, the second branch breaker assembly including a plurality of second branch circuit breakers, and each of the plurality of second branch circuit breakers is configured to switch on or off an electrical connection to a respective one or more loads in the second group of loads,
      wherein the second contactor assembly is configured to connect or disconnect power to the second branch breaker assembly and to the second group of loads all at once; and
   a first power distribution block (PDB), a second PDB, and a third PDB each electrically connected to the main breaker assembly, the first contactor assembly, and the second contactor assembly, wherein each of the first PDB, the second PDB, and the third PDB is disposed downstream of the main breaker assembly and upstream of both the first contactor assembly and the second contactor assembly, wherein each of the first PDB, the second PDB, and the third PDB is associated with a phase of the three-phase power supply, wherein each of the first PDB, the second PDB, and the third PDB is configured to receive single phase electrical power through a single bus and distribute the received single phase electrical power to the first contactor assembly and the second contactor assembly via separate buses.

2. The panelboard assembly of claim 1, further comprising an enclosure enclosing the main breaker assembly, the first subpanel assembly, and the second subpanel assembly.

3. The panelboard assembly of claim 1, wherein at least one of the first contactor assembly or the second contactor assembly is switched on and off through a photoresistor.

4. The panelboard assembly of claim 1, further comprising a branch panel dead front covering at least a portion of the first branch breaker assembly and at least a portion of the second branch breaker assembly, wherein the branch panel dead front further includes one or more slots providing access to at least one of the first branch breaker assembly or the second branch breaker assembly.

5. The panelboard assembly of claim 1, further comprising a main panel dead front covering at least a portion of the main breaker assembly, wherein the main panel dead front further includes one or more slots providing access to the main breaker assembly.

6. The panelboard assembly of claim 1, further comprising a mounting board, wherein the main breaker assembly, the first subpanel assembly, and the second subpanel assembly are mounted on the mounting board.

7. A panelboard assembly for use in environments in which combustible or ignitable materials are present comprising:
   a first subpanel assembly comprising:
      a first contactor assembly configured to be electrically connected to a three-phase power supply; and
      a first branch breaker assembly electrically connected to a load side of the first contactor assembly and configured to be electrically connected to a first group of loads, the first branch breaker assembly including a plurality of first branch circuit breakers, and each of the plurality of first branch circuit breakers is configured to switch on or off an electrical connection to a respective one or more loads in the first group of loads,
      wherein the first contactor assembly is configured to connect or disconnect power to the first branch breaker assembly and to the first group of loads all at once;
   a second subpanel assembly electrically connected in parallel to the first subpanel assembly, the second subpanel assembly comprising:
      a second contactor assembly configured to be electrically connected to the three-phase power supply; and a second branch breaker assembly electrically connected to a load side of the second contactor assembly and configured to be electrically connected to a second group of loads, the second branch breaker assembly including a plurality of second branch circuit breakers, and each of the plurality of second branch circuit breakers is configured to switch on or off an electrical connection to a respective one or more loads in the second group of loads, wherein the second contactor assembly is configured to connect or disconnect power to the second branch breaker assembly and to the second group of loads all at once;

an enclosure enclosing the first subpanel assembly and the second subpanel assembly; and a first power distribution block (PDB), a second PDB, and a third PDB each electrically connected to a main breaker assembly, the first contactor assembly, and the second contactor assembly, wherein each of the first PDB, the second PDB, and the third PDB is disposed downstream of the main breaker assembly and upstream of both the first contactor assembly and the second contactor assembly, wherein each of the first PDB, the second PDB, and the third PDB is associated with a phase of the three-phase power supply, wherein each of the first PDB, the second PDB, and the third PDB is configured to receive single phase electrical power through a single bus and distribute the received single phase electrical power to the first contactor assembly and the second contactor assembly via separate buses.

8. The panelboard assembly of claim 7, wherein the main breaker assembly is electrically connected to the first subpanel assembly and the second subpanel assembly, the main breaker assembly configured to switch on or off an electrical connection to the three-phase power supply.

9. The panelboard assembly of claim 8, further comprising a main panel dead front covering at least a portion of the main breaker assembly, wherein the main panel dead front further includes one or more slots providing access to the main breaker assembly.

10. The panelboard assembly of claim 7, further comprising a mounting board, wherein the first subpanel assembly and the second subpanel assembly are mounted on the mounting board.

11. The panelboard assembly of claim 7, wherein at least one of the first contactor assembly or the second contactor assembly is switched on and off through a photoresistor.

12. The panelboard assembly of claim 7, further comprising a branch panel dead front covering at least a portion of the first branch breaker assembly and at least a portion of the second branch breaker assembly, wherein the branch panel dead front further includes one or more slots providing access to at least one of the first branch breaker assembly or the second branch breaker assembly.

13. A method of assembling an electrical assembly for use in environments in which combustible or ignitable materials are present, the method comprising:

providing a panelboard assembly, the panelboard assembly including:

a main breaker assembly configured to be electrically connected to a three-phase power supply;

a first subpanel assembly including:

a first contactor assembly electrically connected to the main breaker assembly; and a first branch breaker assembly electrically connected to a load side of the first contactor assembly and configured to be electrically connected to a first group of loads, the first branch breaker assembly including a plurality of first branch circuit breakers, and each of the plurality of first branch circuit breakers is configured to switch on or off an electrical connection to a respective one or more loads in the first group of loads, wherein the first contactor assembly is configured to connect or disconnect power to the first branch breaker assembly and to the first group of loads all at once;

a second subpanel assembly electrically connected in parallel to the first subpanel assembly and including:

a second contactor assembly electrically connected to the main breaker assembly; and a second branch breaker assembly electrically connected to a load side of the second contactor assembly and configured to be electrically connected to a second group of loads, the second branch breaker assembly including a plurality of second branch circuit breakers, and each of the plurality of second branch circuit breakers is configured to switch on or off an electrical connection to a respective one or more loads in the second group of loads, wherein the second contactor assembly is configured to connect or disconnect power to the second branch breaker assembly and to the second group of loads all at once; and a first power distribution block (PDB), a second PDB, and a third PDB each electrically connected to the main breaker assembly, the first contactor assembly, and the second contactor assembly, wherein each of the first PDB, the second PDB, and the third PDB is disposed downstream of the main breaker assembly and upstream of both the first contactor assembly and the second contactor assembly, wherein each of the first PDB, the second PDB, and the third PDB is associated with a phase of the three-phase power supply, wherein each of the first PDB, the second PDB, and the third PDB is configured to receive single phase electrical power through a single bus and distribute the received single phase electrical power to the first contactor assembly and the second contactor assembly via separate buses;

electrically connecting the panelboard assembly to the three-phase power supply by electrically connecting the main breaker assembly to the three-phase power supply;

electrically connecting the first group of loads to the first branch breaker assembly by electrically connecting one of the plurality of first branch circuit breakers of the first branch breaker assembly with the one or more loads in the first group of loads; and electrically connecting the second group of loads to the second branch breaker assembly by electrically connecting one of the plurality of second branch circuit breakers of the second branch breaker assembly with the one or more loads in the second group of loads.

14. The method of claim 13, wherein the panelboard assembly further includes an enclosure enclosing the main breaker assembly, the first subpanel assembly, and the second subpanel assembly.

15. The method of claim 13, wherein at least one of the first contactor assembly or the second contactor assembly is switched on and off through a photoresistor.

16. The method of claim 13, wherein the panelboard assembly further includes a branch panel dead front covering at least a portion of the first branch breaker assembly and at least a portion of the second branch breaker assembly, and the branch panel dead front further includes one or more slots providing access to at least one of the first branch breaker assembly or the second branch breaker assembly.

17. The method of claim 13, wherein the panelboard assembly further includes a main panel dead front covering at least a portion of the main breaker assembly, wherein the main panel dead front further includes one or more slots providing access to the main breaker assembly.

18. The method of claim 13, wherein the panelboard assembly further includes a mounting board, wherein the main breaker assembly, the first subpanel assembly, and the second subpanel assembly are mounted on the mounting board.

\* \* \* \* \*